United States Patent
Shloush et al.

(10) Patent No.: US 8,670,873 B2
(45) Date of Patent: Mar. 11, 2014

(54) LIGHTING CONTROL SYSTEM AND METHOD

(75) Inventors: Moshe Shloush, Knoxville, TN (US); Gregory Davis, Maynardville, TN (US)

(73) Assignee: Lumetric Lighting, Inc., Oak Ridge, TN (US)

( * ) Notice: Subject to any disclaimer, the term of this patent is extended or adjusted under 35 U.S.C. 154(b) by 70 days.

(21) Appl. No.: 12/875,132

(22) Filed: Sep. 3, 2010

(65) Prior Publication Data

US 2011/0010019 A1  Jan. 13, 2011

Related U.S. Application Data

(63) Continuation of application No. 12/482,570, filed on Jun. 11, 2009, now Pat. No. 8,143,811.

(60) Provisional application No. 61/075,371, filed on Jun. 25, 2008.

(51) Int. Cl.
| | | |
|---|---|---|
| G05B 11/01 | (2006.01) | |
| G01R 21/00 | (2006.01) | |
| G06F 17/40 | (2006.01) | |
| H02J 3/14 | (2006.01) | |
| H05B 37/02 | (2006.01) | |
| H05B 39/04 | (2006.01) | |
| H05B 41/36 | (2006.01) | |
| G08C 19/16 | (2006.01) | |
| G08B 1/08 | (2006.01) | |

(52) U.S. Cl.
USPC ............ 700/291; 700/22; 700/295; 700/297; 702/62; 702/187; 702/188; 307/39; 315/297; 315/307; 340/12.32; 340/12.5; 340/12.52; 340/521; 340/538; 340/539.1

(58) Field of Classification Search
USPC ........ 700/11, 22, 286, 291, 295–298; 702/57, 702/60–62, 187, 188; 307/11, 38, 39; 315/291, 292, 297, 307, 294; 340/12.1, 340/12.15, 12.22, 12.31, 12.32, 12.5, 12.52, 340/500, 501, 517, 521, 531, 533, 538, 340/539.1

See application file for complete search history.

(56) References Cited

U.S. PATENT DOCUMENTS 4,048,812 A * 9/1977 Thomason ...................... 62/264
4,064,485 A * 12/1977 Leyde ............................ 307/39

(Continued)

FOREIGN PATENT DOCUMENTS

| EP | 0698336 A4 | 2/1996 |
| EP | 1196012 A2 | 4/2002 |

(Continued)

OTHER PUBLICATIONS

HIB Electronic Ballast, ROMlight International Inc., 2 pages, [online] [Retrieved on Jun. 6, 2009] Retrieved from the internet URL:http://www.romlightintl.com/ballasts.cfm.

(Continued)

*Primary Examiner* — Crystal J Barnes-Bullock
(74) *Attorney, Agent, or Firm* — The Mueller Law Office, P.C.

(57) ABSTRACT

Lighting devices are configured to communicate with one another and with external systems. Sensors located at such lighting devices communicate with the external systems and with others of the lighting devices. Lighting is controlled to maintain safety, to drive customer traffic within a retail facility, or to conserve energy. An application programming interface provides a common mechanism for control of various lighting device types.

20 Claims, 6 Drawing Sheets

(56) References Cited

U.S. PATENT DOCUMENTS

| | | | |
|---|---|---|---|
| 4,100,476 A | 7/1978 | Ghiringhelli | |
| 4,207,497 A | 6/1980 | Capewell et al. | |
| 4,207,498 A | 6/1980 | Spira et al. | |
| 4,210,846 A | 7/1980 | Capewell et al. | |
| 4,396,872 A | 8/1983 | Nutter | |
| 4,598,232 A | 7/1986 | Nilssen | |
| 4,652,797 A | 3/1987 | Nilssen | |
| 4,819,180 A * | 4/1989 | Hedman et al. | 700/291 |
| 4,851,739 A | 7/1989 | Nilssen | |
| 4,862,040 A | 8/1989 | Nilssen | |
| 4,874,989 A | 10/1989 | Nilssen | |
| 4,928,039 A | 5/1990 | Nilssen | |
| 4,935,669 A | 6/1990 | Nilssen | |
| 4,939,430 A | 7/1990 | Droho | |
| 4,988,920 A | 1/1991 | Hoeksma | |
| 4,999,547 A | 3/1991 | Ottenstein | |
| 5,303,910 A | 4/1994 | McGill et al. | |
| 5,457,360 A | 10/1995 | Notohamiprodjo et al. | |
| 5,458,075 A | 10/1995 | Tice et al. | |
| 5,459,375 A | 10/1995 | Nilssen | |
| 5,462,225 A * | 10/1995 | Massara et al. | 236/47 |
| 5,489,823 A | 2/1996 | Nilssen | |
| 5,530,322 A | 6/1996 | Ference et al. | |
| 5,550,439 A | 8/1996 | Nilssen | |
| 5,608,291 A | 3/1997 | Nilssen | |
| 5,623,256 A | 4/1997 | Marcoux | |
| 5,661,468 A | 8/1997 | Marcoux | |
| 5,691,603 A | 11/1997 | Nilssen | |
| 5,736,819 A | 4/1998 | Nilssen | |
| 5,757,140 A | 5/1998 | Nilssen | |
| 5,761,083 A * | 6/1998 | Brown et al. | 700/296 |
| 5,839,382 A | 11/1998 | Tice et al. | |
| 5,927,598 A * | 7/1999 | Broe | 236/46 R |
| 5,945,993 A | 8/1999 | Fleischmann | |
| 5,990,634 A | 11/1999 | Brown | |
| 6,107,749 A | 8/2000 | Nilssen | |
| 6,135,040 A | 10/2000 | Tice et al. | |
| 6,138,241 A | 10/2000 | Eckel et al. | |
| 6,232,727 B1 | 5/2001 | Chee et al. | |
| 6,297,612 B1 | 10/2001 | Shloush et al. | |
| 6,385,732 B1 | 5/2002 | Eckel et al. | |
| 6,388,396 B1 | 5/2002 | Katyl et al. | |
| 6,486,615 B2 | 11/2002 | Hui et al. | |
| 6,538,568 B2 | 3/2003 | Conley, III | |
| 6,598,092 B2 | 7/2003 | Tomizawa et al. | |
| 6,650,067 B1 | 11/2003 | Shloush et al. | |
| 6,791,458 B2 | 9/2004 | Baldwin | |
| 6,832,135 B2 * | 12/2004 | Ying | 700/295 |
| 6,894,610 B2 | 5/2005 | Schubert et al. | |
| 6,990,394 B2 | 1/2006 | Pasternak | |
| 7,098,598 B2 | 8/2006 | Kraus et al. | |
| 7,099,784 B2 * | 8/2006 | Spitaels et al. | 702/57 |
| 7,109,668 B2 | 9/2006 | Pogodayev et al. | |
| 7,116,245 B1 | 10/2006 | Bachelder | |
| 7,129,647 B2 | 10/2006 | DuLaney et al. | |
| 7,180,251 B2 | 2/2007 | van Eerden | |
| 7,235,932 B2 | 6/2007 | Crandall et al. | |
| 7,239,094 B2 | 7/2007 | Radzinski et al. | |
| 7,252,406 B2 | 8/2007 | Crandall | |
| 7,262,559 B2 | 8/2007 | Tripathi et al. | |
| 7,307,386 B2 | 12/2007 | Fishbein et al. | |
| 7,309,975 B2 | 12/2007 | Fishbein et al. | |
| 7,355,354 B2 | 4/2008 | Rust et al. | |
| 7,369,060 B2 | 5/2008 | Veskovic et al. | |
| 7,388,334 B2 | 6/2008 | Crandall et al. | |
| 7,521,873 B2 | 4/2009 | Hui et al. | |
| 7,573,372 B2 | 8/2009 | Mogilner et al. | |
| 7,603,184 B2 | 10/2009 | Walters et al. | |
| 7,619,539 B2 | 11/2009 | Veskovic et al. | |
| 7,638,743 B2 | 12/2009 | Bartol et al. | |
| 7,650,323 B2 | 1/2010 | Hesse et al. | |
| 7,659,673 B2 | 2/2010 | Lys | |
| 7,688,005 B2 | 3/2010 | Reid | |
| 7,734,356 B2 | 6/2010 | Cleland et al. | |
| 7,737,643 B2 | 6/2010 | Lys | |
| 7,747,357 B2 | 6/2010 | Murdoch | |
| 7,765,033 B2 | 7/2010 | Perry | |
| 7,791,492 B2 | 9/2010 | Nam et al. | |
| 7,800,319 B2 | 9/2010 | Raneri | |
| 7,827,419 B2 * | 11/2010 | Shaffer et al. | 713/300 |
| 7,857,498 B2 | 12/2010 | Smith | |
| 7,859,398 B2 * | 12/2010 | Davidson et al. | 340/539.1 |
| 7,911,326 B2 * | 3/2011 | Sutardja | 340/12.32 |
| 8,085,164 B2 | 12/2011 | Carkner | |
| 8,193,929 B1 * | 6/2012 | Siu et al. | 340/538 |
| 2001/0047212 A1 | 11/2001 | Hewlett et al. | |
| 2002/0007510 A1 | 1/2002 | Mann | |
| 2004/0105264 A1 | 6/2004 | Spero | |
| 2007/0008710 A1 | 1/2007 | Nielson et al. | |
| 2007/0021874 A1 * | 1/2007 | Rognli et al. | 700/295 |
| 2007/0041181 A1 | 2/2007 | Shofar | |
| 2007/0273307 A1 | 11/2007 | Westrick et al. | |
| 2008/0094005 A1 | 4/2008 | Rabiner et al. | |
| 2008/0185977 A1 | 8/2008 | Veskovic et al. | |
| 2008/0231203 A1 | 9/2008 | Budde et al. | |
| 2008/0258633 A1 | 10/2008 | Voysey | |
| 2009/0045971 A1 | 2/2009 | Simons et al. | |
| 2009/0224690 A1 * | 9/2009 | Xu et al. | 315/292 |
| 2009/0240380 A1 * | 9/2009 | Shah et al. | 700/295 |
| 2009/0243517 A1 | 10/2009 | Verfuerth et al. | |
| 2009/0267540 A1 | 10/2009 | Chemel et al. | |
| 2010/0134042 A1 | 6/2010 | Willaert | |
| 2010/0181935 A1 | 7/2010 | Wu | |
| 2010/0188009 A1 | 7/2010 | Bull | |
| 2010/0225240 A1 | 9/2010 | Shearer et al. | |
| 2010/0241255 A1 | 9/2010 | Benetz et al. | |
| 2010/0244721 A1 | 9/2010 | Shloush et al. | |
| 2010/0301781 A1 | 12/2010 | Budike, Jr. | |

FOREIGN PATENT DOCUMENTS

| | | |
|---|---|---|
| EP | 1493621 A2 | 1/2005 |
| EP | 1615479 A2 | 1/2006 |
| EP | 1724909 A2 | 11/2006 |
| EP | 1754933 A2 | 2/2007 |
| EP | 1393599 B1 | 5/2010 |
| WO | 2005043955 | 5/2005 |
| WO | 2009069062 A1 | 6/2009 |

OTHER PUBLICATIONS

HIB Electronic High Bay Fixtures, ROMlight International Inc., 2 pages, [online] [Retrieved on Jun. 6, 2009] Retrieved from the internet URL:http://www.romlightintl.com/fixtures.cfm.

Data sheet: Metrolight Smart Electronic Ballast for HID™ 250/320/350/400/450 Watt, Metrolight Inc., 2007, 2 pages, Can be retrieved from the internet URL:http://www.metrolight.com.

Crockett, J., "Dimmable Ballasts: Consider Digital," Consulting—Specifying Engineer, Specifier's Notebook, Aug. 2006, 1 page.

"Lumenergi Executive Summary," Lumenergi LLC, Nov. 21, 2006, 2 pages.

Dilouie, C., "DALI XP Draft Standard Promises Major Breakthrough in Digital Lighting," Lighting Controls Association, Sep. 2008, 3 pages [online] [Retrieved on Jul. 14, 2009] Retrieved from the internet URL:http://www.aboutlightingcontrols.org/education/papers/2008_dalixp.shtml.

Yarris, L., "Feeling the Heat: Berkeley Researchers Make Thermoelectric Breakthrough in Silicon Nanowires," Research News Berkeley Lab, Jan. 9, 2008, 3 pages [online] [Retrieved on Jul. 14, 2009] Retrieved from the internet URL:http://www.lbl.gov/Science-Articles/Archive/MSD-silicon-nanowires.html.

"IEPC Corporation, VB Sales," Process Register, Last Updated Jul. 13, 2009, 1 page. [online] [Retrieved on Jul. 14, 2009] Retrieved from the internet URL:http://www.processregister.com/IEPC_Corporation_VB_Sales/Supplier/sid7582.htm.

"Greening the Lighting Industry for High Performance with LED Systems (IEPC)," California Green Solutions, 4 pages [online] [Retrieved on Jul. 14, 2009] Retrieved from the internet URL:http://www.californiagreensolutions.com/cgi-bin/gt/tpl.h,content=1719.

"IEPC International Engineering Products & Consulting: VB400 Lighting Control Optimizes HID Lamp Performance," New Equip-

(56) References Cited

OTHER PUBLICATIONS ment Digest, May 29, 2007, 1 page. [online] [Retrieved on Jul. 14, 2009] Retrieved from the internet URL:http://www.newequipment.com/303/ProductDetail/61958NB400_Lighting_Control_Optimizes_HID_Lamp_Performance.aspx.

Product News—"Lighting Control System suits fluorescent applications," Sep. 19, 2007; Original Press Release: "VBC Lighting Control Now Available for Fluorescent Applications," Aug. 27, 2007, ThomasNet Industrial NewsRoom, 6 pages [online] [Retrieved on Jul. 14, 2009] Retrieved from the internet URL:http://news.thomasnet.com/fullstory/804617.

Product News—"Lighting Control offers efficient option for HID users," May 31, 2007; Original Press Release: "VB400 Lighting Control Saves Energy and Costs Over T5/T8 Replacements," May 8, 2007, ThomasNet Industrial NewsRoom, 4 pages [online] [Retrieved on Jul. 14, 2009] Retrieved from the Internet URL:http://news.thomasnet.com/fullstory/518726.

Company Profile for IEPC Corp., Last Modified Mar. 9, 2008, [online] [Retrieved on Mar. 9, 2008] Retrieved from the internet URL:http://www.thomasnet.com/profilenews.html?cid=10111507&navsec=news&WT.mc_t=INR&WT.mc_n=minf.

"IEPC Corp.'s Re-Lamping Program Ensures Brightness, Energy Savings Over Time," IEPC Corporation International Engineering Products & Consulting, May 8, 2007, 3 pages, can be retrieved at URL:http://recmgmt.com/rmnews/0508.relamping.pr.pdf.

"Getting the Most Lighting for the Buck," Electrical Contracting Products, Cygnus Business Media, Jul. 8, 2008, 8 pages [online] [Retrieved on Jul. 14, 2009] Retrieved from the internet URL:http://www.ecpzone.conn/publication/article.jsp?pubId=2&id=2669&pageNum=1.

International Engineering Products and Consulting Corporation Homepage, IEPC Corp., 1 page [online] [Retrieved on Jul. 14, 2009] Retrieved from the internet URL:http://www.iepc.cd?page=home.

LUM Energy—Company, Lumenergi, 2006, 3 pages [online] [Retrieved on Dec. 18, 2007] Retrieved from the internet URL:http://www.lumenergi.com/company.html.

LUM Energy—Lighting, Lumenergi, 2006, 1 page [online] [Retrieved on Dec. 18, 2007] Retrieved from the internet URL:http://www.lumenergi.com/lighting.html.

Cortese, A., "'Green' Buildings Don't Have to Be New," The New York Times, Jan. 27, 2008, 5 pages [online] [Retrieved on Feb. 5, 2008] Retrieved from the internet URL:http://www.nytimes.com/2008/01/27/realestate/c...c9d361&ex=1202360400&emc=eta1&pagewanted=print.

High Intensity Discharge Lighting Technology Workshop Report, Nov. 15, 2005, 170 Pages.

"e-Vision—Delivering performance that drives your business forward," Halogen Conversion Brochure, Advance Transformer Co., 2008, 12 Pages.

"The ABC's of High Intensity Discharge (HID) Ballast," Advance Transformer Co., 2005, 24 Pages.

"Products and Services," DC Velocity, Feb. 2008, 1 page, [online] [Retrieved on Jul. 20, 2009] Retrieved from the internet URL:http://www.dcvelocity.com/products/?product_id=1007.

"Advance Introduces Power New e-Vision ® Electronic HID Ballast for Two 39W Metal Halide Lamps," Lighting Controls Association, 1 Page, [online] [Retrieved on Jul. 20, 2009] Retrieved from the internet URL:http://www.aboutlightingcontrols.org/products/newprods/advance/advance-20060906.shtml.

"Navigating New Worlds in Light," Brochure, MagneTek, Universal Triad, 2000, 4 Pages.

"L.A. County Slashes Energy Costs 77% With Retrofit Using MagneTek Electronic Ballasts," Protraits #7, MagnTek, Jul. 30, 1998, 2 Pages.

"Luminoptics Changes Name to Lumenergi," News Release, Lumenergi, Apr. 25, 2006, 2 Pages.

International Search Report and Written Opinion Dated Feb. 17, 2012 for PCT Application No. PCT/US2010/040503.

Invitation to Pay Additional Fees and, Where Applicable, Protest Fee dated Apr. 4, 2011 for PCT Application No. PCT/US2010/040503.

Office Action dated Feb. 16, 2011 for U.S. Appl. No. 12/482,570.
Office Action dated Nov. 26, 2010 for U.S. Appl. No. 12/482,570.
Office Action dated Dec. 21, 2010 for U.S. Appl. No. 12/418,755.
Office Action dated Apr. 25, 2013 for U.S. Appl. No. 12/826,666.
Office Action dated Sep. 25, 2013 for U.S. Appl. No. 12/826,666.
Translation of the Mexican Office Action dated Jul. 3, 2013 for Mexican Application No. MX/a/2012/014781.

* cited by examiner

300  Figure 3

LIGHTING CONTROL SYSTEM AND METHOD

RELATED APPLICATION

This application is a continuation of U.S. application Ser. No. 12/482,570, filed Jun. 11, 2009 which claims the benefit of U.S. Provisional Application No. 61/075,371, filed Jun. 25, 2008. U.S. application Ser. No. 12/482,570 and U.S. Provisional Application No. 61/075,371 are both incorporated by reference in their entirety herein as if they were put forth in full below.

BACKGROUND

This invention relates generally to control of electrical lighting, and more particularly to lighting control particular to lighting devices with onboard processors providing programmable control of the devices.

Recent advances in ballast-controlled lighting devices have led to availability of programmable luminaires. Some of these devices include microprocessors for control of the devices, e.g., providing automated dimming capabilities and power management features.

On-board processing capabilities allow local control of certain operating parameters. To date, such control has been limited to traditional lighting aspects, such as activity sensors to illuminate an area only when it is occupied, timer mechanisms to disable some or all of the lights in a lighting system during periods when a facility is not occupied, automatic dusk/dawn control and the like.

Significant energy savings, light pollution reduction, and equipment life advantages might be obtained if more sophisticated approaches were used to controlling lighting systems than is currently employed.

Known disclosures, such as U.S. Pat. No. 5,530,322, have described some efforts to address some of the aforementioned issues, for instance through use of a single microprocessor controlling multiple lamps. These prior approaches do not take full advantage of local processing power now available at the luminaires themselves, and a need remains for improved control methods and systems that make more use of such on-board local processing capability.

SUMMARY

In accordance with the present invention, a lighting device includes a plurality of ports. In one embodiment, one of the ports is adapted to connect with a sensor. In various embodiments, the sensor is a daylight harvesting sensor, an occupancy/motion sensor, or a camera for still pictures or video. In another embodiment, one of the ports is adapted to connect with a data device such as a router, switch, or computer. In one embodiment, the ports are powered from the lighting device. In another embodiment, at least one of the ports includes a subsystem providing conversion from one communication protocol to another. In one embodiment, at least one of the ports is configured for bi-directional communications. In another embodiment, at least one of the ports is configured for unidirectional communications. In still another embodiment, the lighting device further provides power output adapted for peripheral devices.

Also in accordance with the present invention, the lighting device is configured to communicate with external systems so as to report local conditions at the lighting device. In one aspect, the local conditions relate to the operation of the lighting device itself, such as lighting output, operating hours, input voltage variation; in another aspect the local conditions relate to the environment of the lighting device itself, such as ambient light in the vicinity of the lighting device, speed of traffic in the vicinity of the lighting device; number of persons or animals in the service area of the lighting device, localized weather conditions, air pollution data, ambient noise, and other local conditions. The local conditions are in one embodiment determined using sensors having limited or no data processing capability by using the processing capability within the lighting device itself, while in other embodiments, sensors with on-board processing communicate with the lighting device.

Still further in accordance with the present invention, the lighting device is controlled both locally and remotely via software commands. In one aspect, software commands are received via one of the ports; in another aspect, software commands are wirelessly provided from a remote location. In one specific application, lighting within a retail facility is remotely controlled to encourage shoppers to use brighter paths through the store as marketing considerations may dictate, without the drawbacks of traditional lane-blocking and department-locating techniques to maneuver shoppers through various parts of a store. In an even more specific application, a store drives traffic through one pathway in the morning where products for use in the morning are located (e.g., newspapers, coffee and pastries) and another in the afternoon where products for use in the evening are located (e.g., ready-made dinners, snack foods). An artificial intelligence subsystem adapts the lighting level in various areas based on energy efficiency considerations and marketing considerations. Even within an aisle, selective lighting control from the subsystem emphasizes one product shelf area more than another as a shopper moves toward that area, again to provide shoppers with subtle suggestions as to where they should direct their attention.

In a related industrial application, feedback is provided from machinery when it is in operation to change control parameters for lighting that illuminates that area. Thus, when a reduction in energy usage is sought, lighting in areas with idle machinery is reduced more than lighting in areas where machines are operational. Such machinery feedback includes not only and indication that the machine is on, but also information sufficient to determine the importance of maintaining a given level of lighting. Similarly, HVAC system control is subject to the status of equipment that is located in the corresponding area. Computer servers sitting at idle, for example, are more tolerant of reduced cooling from the HVAC system than servers that are operating at a significant proportion of capacity.

In another aspect, a lighting system includes a plurality of lighting devices communicating with one another. In one embodiment, sensors on one lighting device communicate with another lighting device, for example to indicate that the presence of traffic is expected soon. In another embodiment, conventional data processing networking is used to provide communication among lighting devices. In still a further embodiment, a mix of conventional analog lighting control circuitry and data processing networking provides communication among a plurality of lighting devices. In yet a further aspect, a subset of lighting devices are grouped into a zone to allow common control and reporting of a plurality of lighting devices. In a specific aspect, connections among lighting devices are implemented in a daisy-chain manner.

Further in accordance with the present invention, an application programming interface (API) provides a common programming interface to a plurality of hardware lighting device types. In one embodiment, the system is self-configuring via the API so that a user is presented with only those options that are actually available for a particular type of lighting device. In accordance with the invention, the API includes modules configured to operate HID, fluorescent, filament and other lighting devices as well as related systems, including sensors, alarms, Heating/Ventilation/Air Conditioning, and physical plant access controls.

In a related aspect of the invention, a dynamic demand response subsystem operatively connected to the lighting devices and other related systems selectively switches devices to lower power modes (including turning them off) in accordance with programming instructions based on environmental factors such as peak grid load exceeding a critical threshold, and energy cost exceeding a predetermined threshold. Feedback from individual devices is provided to determine which devices are most appropriate to depower. For example, during the morning of a very hot day, lighting devices are depowered rather than HVAC systems, while later in that day as ambient light decreases, more energy is allocated to the lighting devices and the HVAC is depowered as appropriate for energy savings requirements. As another example, lighting in aisles of a retail store that are experiencing relatively high shopper traffic are dimmed less than those with few or no shoppers at any particular time. The lighting and HVAC devices themselves provide location-specific feedback as to how much their operation is needed at any particular time.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

Overview

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
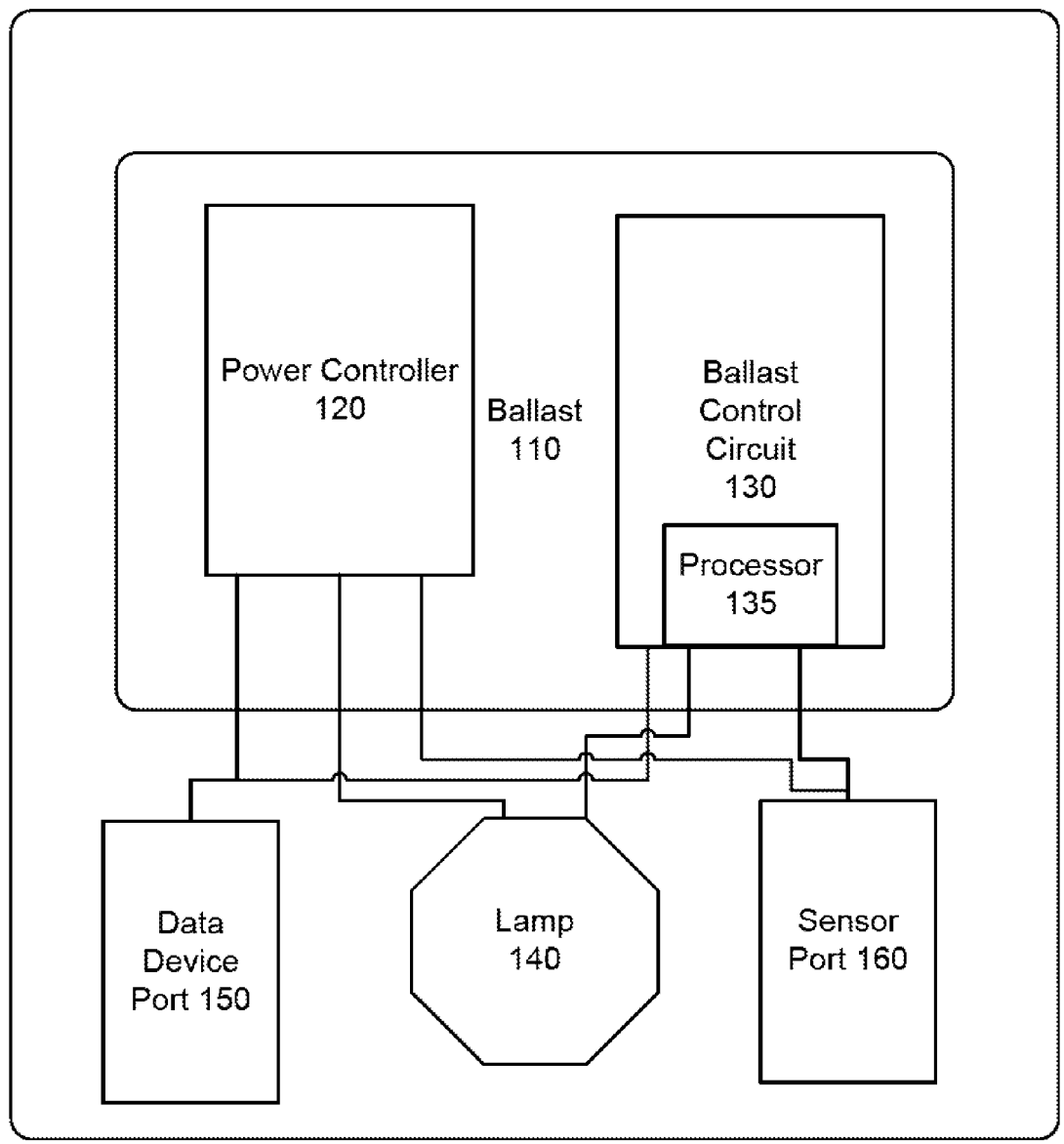
FIG. 1 is a system block diagram of a luminaire.

FIG. 1 illustrates in block diagram form a luminaire 100, including a ballast 110 and a lamp 140. In a preferred embodiment, lamp 140 is a high intensity discharge lamp, such as a mercury vapor lamp, a metal halide lamp, or a high pressure sodium lamp. In other embodiments, other types of lamps for which ballast control is desirable are used for lamp 140. Ballast 110 is in a preferred embodiment a programmable ballast including a power controller power factor correction (PFC) circuit 120 and a ballast control circuit 130. In a preferred embodiment, power controller 120 includes a power factor correction circuit for providing electricity to lamp 140 and a peripheral power supply circuit for providing power to devices connected to luminaire 100, as described below. Ballast control circuit 130 includes a processor 135 which, in a preferred embodiment, is a programmed digital signal processing device such as a Texas Instruments Series TMS320 device. Luminaire 100 also includes a data device port 150 and a sensor port 160. Data device port 160 is configured for connection with a computer, terminal or other data device for application as described below. Sensor port 160 is configured for connection to environmental and other sensors as described below. Both ports 150 and 160 have data connections to ballast control circuit 130 so as to allow programmable control and communications using processor 135, as well as power connections to, in one embodiment, ballast control circuit 130 and in an alternate embodiment, to allow the ports 150 and 160 to provide a power source to devices that are connected thereto, as appropriate for each connected device.

Figure 2:
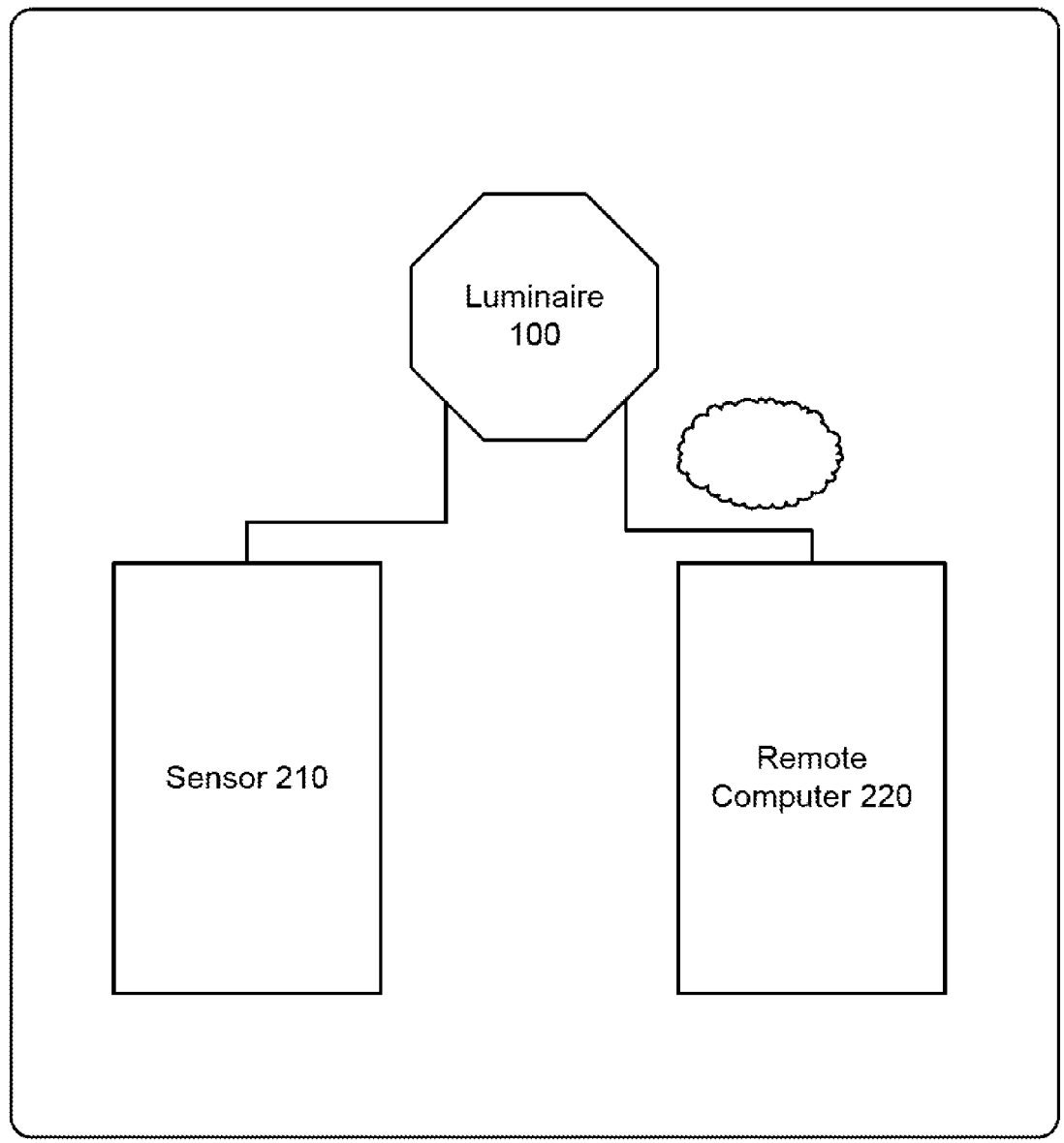
FIG. 2 is a system block diagram of a lighting system including a luminaire, a sensor and a remote computer.

Referring now to FIG. 2, a system diagram of a lighting system 200 is shown. This diagram includes, for simplicity of description, only major functional components used for the discussion herein; those skilled in the art will recognize that other subsystems and components, are also included in accordance with best practices in the field. Luminaire 100 operably communicates with a sensor 210 and a remote computer 220. Referring again to FIG. 1, in a preferred embodiment sensor 210 is connected to luminaire 100 via sensor port 160, and remote computer 220 is connected to luminaire 100 via data device port 150. Sensor port 160 and processor 135 are configured to automatically detect a sensor type that is connected to sensor port 160 and provide both appropriate power via power controller 120 and data communications via ballast control circuit 130 to allow operation with a variety of sensors. In one application, the sensors are "dumb" units that do not have any on-board processing capabilities of their own (e.g., a simple photodiode-based light sensor). In such applications, raw input provided by the sensor is processed by processor 135 to determine information used for control of lighting system 200. In another application, the sensors do have their own on-board processing and they communicate interactively with processor 135 for control of lighting system 200. In one embodiment, pins in sensor port 160 are configured so that by dropping certain pin connections to ground signal level for each type of dumb sensor, a code can be provided identifying the type of dumb sensor. For instance, in one specific embodiment a connection plug drops pin 10 to ground to indicate a thermistor and pin 11 to ground to indicate a photodetector.

Ports 150 and 160 are both intended for general purpose use with a variety of connected devices. Additional flexibility is achieved by the ports being configurable for either unidirectional or bidirectional communications, under any of a number of conventional communications protocols. In one embodiment, each of ports 150, 160 includes Uniform Serial Bus (USB), Ethernet, Wi-Fi (802.11) and single-wire bus connections with auto-detect of which is connected at any particular time.

The connection between luminaire 100 and remote computer 220 is shown with a cloud next to it to indicate that in one application, remote computer 220 is not connected directly to luminaire 100 but instead communicates indirectly with luminaire 100, for instance using a network such as the Internet and a client web-based interface. Depending on the application, data device port 150 is configured for corresponding connection types. In an alternate application, ports 150 and 160 are configured for wireless communications with sensor 210 and remote computer 220. Intermediate devices such as switches and routers are in a preferred embodiment used to facilitate communication with remote computer 220.

Specifically, in various embodiments Data Port 150 includes a plurality of communication topologies and protocols such as Ethernet with TCP/IP, Wi-Fi (802.11), RS-485, and RS-232. Each topology/protocol has its advantages and disadvantages. In customer facilities, many of these topologies/protocols can be found in legacy equipment. If luminaire 100 were configured only with a topology/protocol via Data Port 150 that is not in use with a particular facility, then the facility would have to undergo costly infrastructure changes to accommodate luminaire 100 or simply not use luminaire 100's Data Port 150. For instance, if a facility were already configured with RS-485, which is standard with many industrial devices, but luminaire 100's Data Port 150 supported only Ethernet (TCP/IP), then the two networks could be incompatible.

To expand the topologies/protocols of luminaire 100, external translation devices (not shown) bridge multiple networks together. In a preferred environment, Data Port 150 has a base configuration of a low-cost interface such as RS-232. This allows direct connection to a PC in a non-networked environment, which is desirable for configuring luminaire 100 during installation. To expand luminaire 100 to operate in a networked environment, a device bridge is created that translates the native topology/protocol of the facilities network to RS-232 (or whatever topology/protocol Data Port 150 is configured to). For instance, if the facility network is Ethernet (TCP/IP), the bridge consists of a traditional RJ-45 connector to accept the Ethernet cable. The bridge contains circuitry to hold the TCP/IP address and communicate bi-directional with the Ethernet (TCP/IP) network. Internally the bridge accepts TCP/IP messages and converts them to ASCII messages that are compatible with RS-232 (found in Data Port 150). The bridge maintains the TCP/IP socket (so that a return message may be sent to the proper address of the sender) and transmits the converted ASCII message to Data Port 150, which is received by luminaire 100 via Processor 135. Processor 135 then takes action on the received message and may send a return ASCII message out Data Port 150 (RS-232), which is received by the bridge. The bridge then converts the ASCII message to TCP/IP and transmits it out onto the Ethernet network via the retained TCP/IP socket.

Likewise, if the facility replaces its TCP/IP network with wireless or some other newer network at some point in the future, the bridge is simply replaced with another bridge that matches the new network, saving the need to need to replace luminaire 100.

In an alternate embodiment, luminaire 100 with Data Port 150 includes a more advanced topology/protocol than one such as RS-232. This advanced topology/protocol contains a method to network multiple luminaires (100) such as in a daisy-chain manner where each luminaire accepts individual messages addressed specifically to it. With this configuration, a single bridge (as described above) is attached to luminaire topology as well as an external network found in the facility. As described before the bridge translates messages from one network to the other. For example, Data Port 150 is configured with a proprietary daisy-chained messaging system with a method to accept an inbound cable and an outbound cable. This is accomplished, for example, by Data Port 150 having two cable jacks or alternatively a coupler splitting device (such as a t-connector found in older coaxial Ethernet systems). Luminaire A is configured with a bridge as described earlier that is connected to an external network. Messages received from the external network are translated and transmitted to Data Port 150 as described above. Luminaire A receives the message via Data Port 150 and examines the address included in the message and if the address matches the internally stored address of luminaire A, then luminaire A reads the message itself. If the address does not match it transmits the message out Data Port 150 to luminaire B on the daisy-chained network. Luminaire B performs the same examination of the message and either reads it or sends it to the next luminaire. If the receiving luminaire needs to send a return message, it is sent back up the chain until it reaches luminaire A, which transmits the message out the bridge to the external network. In some embodiments, a bridge is configured as a pass-through to allow messages destined for other nodes to simply be forwarded on along the network. In yet other embodiments, gateway bridges include processors that determine routing for messages and send them along the appropriate path. For example, a gateway bridge may be connected to a remote computer via a TCP/IP connection and may also be connected to two separate serial rings. In such situation, the gateway is configured to receive data such as commands from the remote computer and to send the corresponding message onto the appropriate ring. Such gateway bridges are also configurable to serve other network functions as may be appropriate, such as acting as switches, routers and repeaters.

In an alternate version of the internal daisy-chained network, luminaire A is not connected to a bridge but only to other luminaires as described above. Luminaire A determines that it only has a cable connected to its OUT port, so it configures itself as a master. The remaining luminaires have cables connected to the IN port as well as their OUT port (except for the last luminaire which is only connected via the IN). The luminaires that have connections to its IN and OUT ports self-configure themselves to be repeaters. The master has a sensor such as a motion sensor connected to sensor port 160. When the master detects that no motion has occurred in a given time duration, it dims to a preset value. Simultaneously, it sends a dimming command via the daisy-chained network to the first repeater luminaire. The repeater accepts the dimming command and dims. The repeater then sends the same command to the next luminaire in the chain and the process is repeated until the last luminaire in the chain receives the message. Since the last luminaire does not have a connection to its OUT port, the command is not sent. This method is useful in zone dimming. It is sometimes desirable to have one sensor control the dimming of a multitude of light fixtures in an area, where they all dim and undim in unison. Traditionally, this requires extensive wiring of multiple analog control power lines. This wiring is expensive and can only be extended to a limited number of fixtures due to signal loss because of the resistance of the wire itself. The daisy-chained network above creates an autonomous digital network that requires only a single cable without the problem of analog signal loss.

Figure 3:
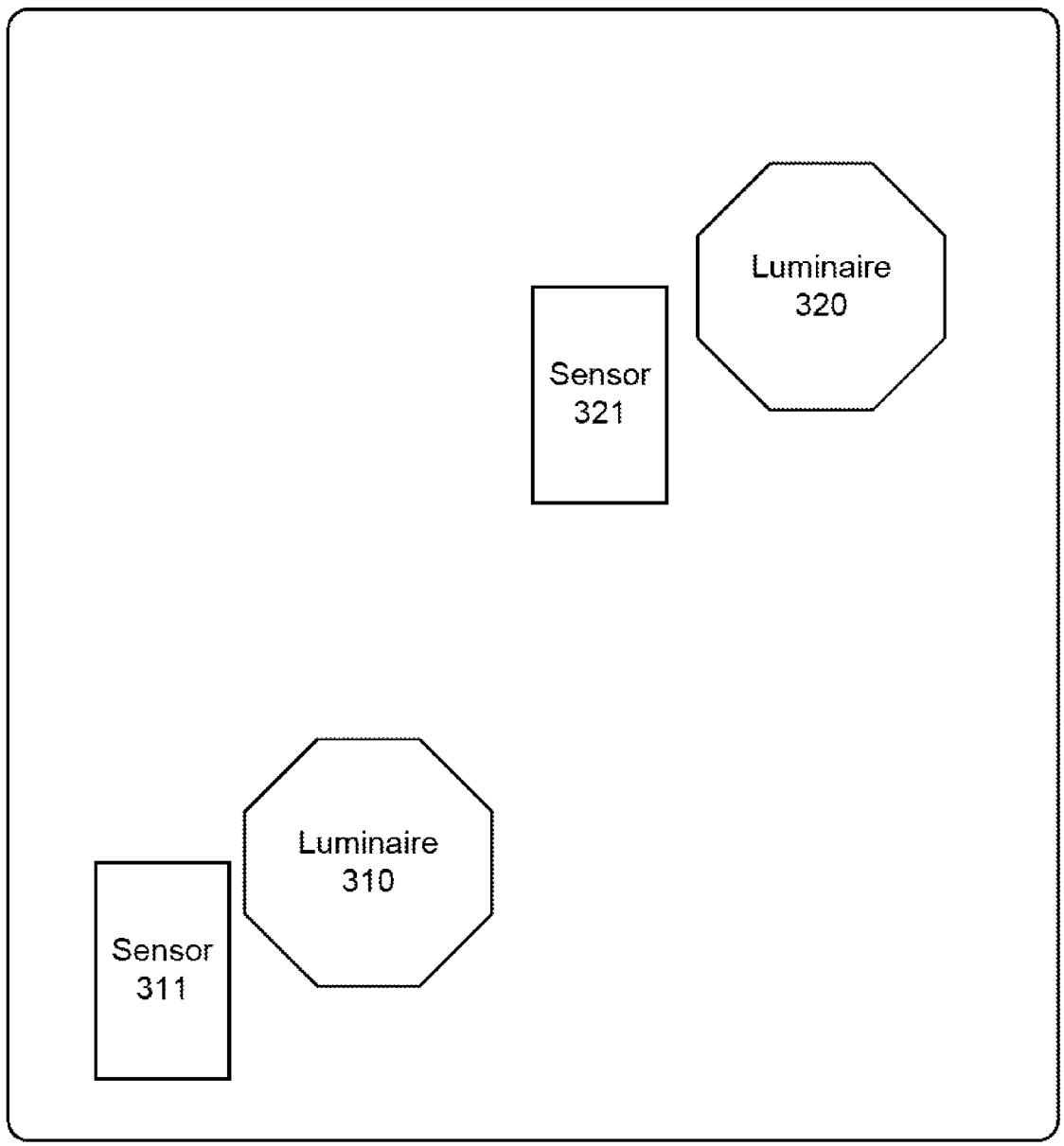
FIG. 3 is a simplified system block diagram of a roadway lighting system.

Referring now to FIG. 3, a system block diagram of a roadway lighting system 300 is shown. As with FIG. 2, this diagram includes, for simplicity of description, only major functional components used for the discussion herein; those skilled in the art will recognize that additional subsystems and components are also included as appropriate for specific applications. System 300 includes two pairs of lighting devices, luminaire 310 and associated sensor 311, and luminaire 320 and associated sensor 321. In a preferred embodiment, luminaire 310 is in communication with luminaire 320. In one application, such communication is achieved using conventional wireless networking; in another a port such described in FIG. 1 (e.g., data device port 150) is used in connection with conventional TCP/IP network protocols to connect multiple lighting devices in daisy-chain, hub-and-spoke or other conventional topologies as may be appropriate for a given application. In one specific roadway-based application, daisy-chain/serial ring connection is used to minimize wiring requirements. Connection of multiple devices in this manner allows a remote computer, e.g., 220, to be connected to only one of several lighting devices yet allows that remote computer 220 to control the additional devices that are in communication with that lighting device.

Furthermore, information pertinent to one lighting device is communicated to another. In one application, sensor 311 is a light sensor configured to detect traffic headed toward the area illuminated by luminaire 310. In one application, detection of such traffic results in luminaire 310 having increased output, as well as provision of an instruction to luminaire 320 to being increasing its output as well. In many applications, advance warning of the need for illumination allows more gradual increase of illumination at luminaire 320, with corresponding increased lamp life and full illumination at the time that a motorist enters the area illuminated by luminaire 320. An additional benefit provided by such communication is the avoidance of distracting changes in illumination that would result if luminaire 320 were only controlled by its own sensor 321. Thus, system 300 provides what appears to motorists to be constant illumination, even though luminaires 310, 320 are only powered up from a resting state in response to proximity detection by sensors 311, 321.

In related embodiments, sensor 311 is implemented with a traffic speed sensor to determine a minimal safe lighting level. In one aspect, if traffic at higher speed is detected, luminaires 310, 320 increase light output for safety reasons. In another aspect, sensors measure line input voltage at each luminaire; due to utility transformers, wiring losses and other factors, voltage at each luminaire may vary from nominal mains voltage, and by sensing those differences output of each luminaire is adjusted correspondingly for uniform light output. Likewise, direct measurement of the output from each luminaire by sensor 311 permits adjusting luminaire output as lamps age, as ambient light differs from place to place along the roadway, and the like. In some areas, presence of animals, whether cattle grazing or moose or deer traversing a roadway may call for increased lighting for safety, so sensor 311 includes proximity sensing of animals. Other environmental conditions, such as rain, snow, haze, fog, smog and the like may in some applications also call for different lighting, and sensor 311 for these parameters adjust lighting accordingly. In more urban locations, it may be that increases in ambient noise, whether from vehicle engines, tires, horns or pedestrians, suggest a need for greater lighting for safety and in some applications these are sensed via sensor 311.

Because luminaires 100 include on-board processing capabilities, in many applications sensor 311 is implemented in a cost-effective manner by a simple transducer, such as a photodiode, thermistor or microphone, with the signal variations therefrom being interpreted by processor 135 as needed.

Figure 4:
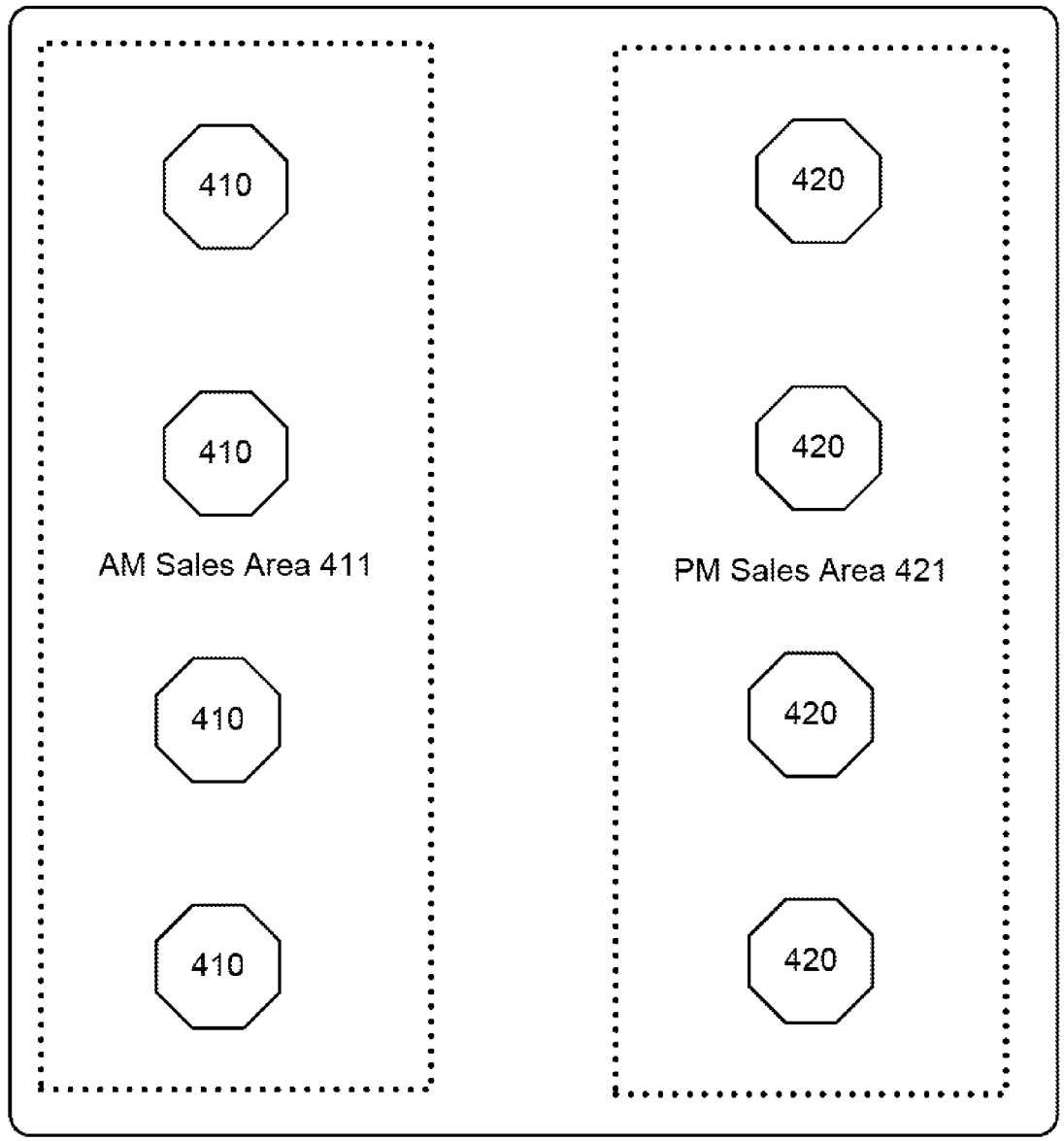
FIG. 4. is a simplified system block diagram of a retail facility lighting system.

Referring now to FIG. 4, a system diagram of a retail facility lighting system 400 is shown. As with the prior figures, this diagram includes, for simplicity of description, only major functional components used for the discussion herein.

Many retail facilities have different areas that, for marketing reasons, the retailer may wish shoppers to visit at different times. For example, a retail location may have an area 411 with products more likely to be purchased in the morning, such as newspapers, coffee and pastries. Another area 421 may have products more likely to be purchased in the afternoon, such as ready-to-eat dinners. Impulse purchases by customers are enhanced by routing customer traffic through the areas having products that customers are more likely to purchase at any particular time. One way to encourage customers to take one path through a store rather than another is through control of lighting. In practice, a brighter pathway is generally preferred by customers to one that is more dimly lit. Thus, in the morning system 400 increases the output of lighting devices 410 in the morning sales area relative to the lighting devices 420. In the afternoon, system 400 increases the output of lighting devices 420 relative to lighting devices 410 to drive more shopper traffic to the afternoon sales area 421. This simplified description is readily expandable in practice to more complex scenarios. For example, traffic is driven to seasonal areas (Christmas ornaments, Halloween costumes and the like) in the same manner. As an example with still more detail, sunny weather drives more traffic to beach apparel and swim toys, while cold, cloudy weather drives more traffic to snow shovels. Traditionally, retailers have had to physically move fixtures to change traffic flow through stores, or physically move products to maximize opportunities for impulse buying. System 400 is configured to programmably alter lighting schemes within a facility to help direct shoppers to particular areas of interest.

In still another application, areas of a store that do not typically result in impulse sales, such as auto parts, are programmably dimmed relative to other portions of the store except during periods of high expected traffic where additional lighting is appropriate. As further detailed below, reductions in illumination to respond to peak energy costs, potential blackouts or brownouts, and the like, are also selectively accomplished in this manner so as to achieve desired energy goals without impacting the effectiveness of the retail location. In some applications, luminaires are best controlled on an individual basis while in others grouping of individual luminaires into zones provides the most desirable results.

Figure 5:
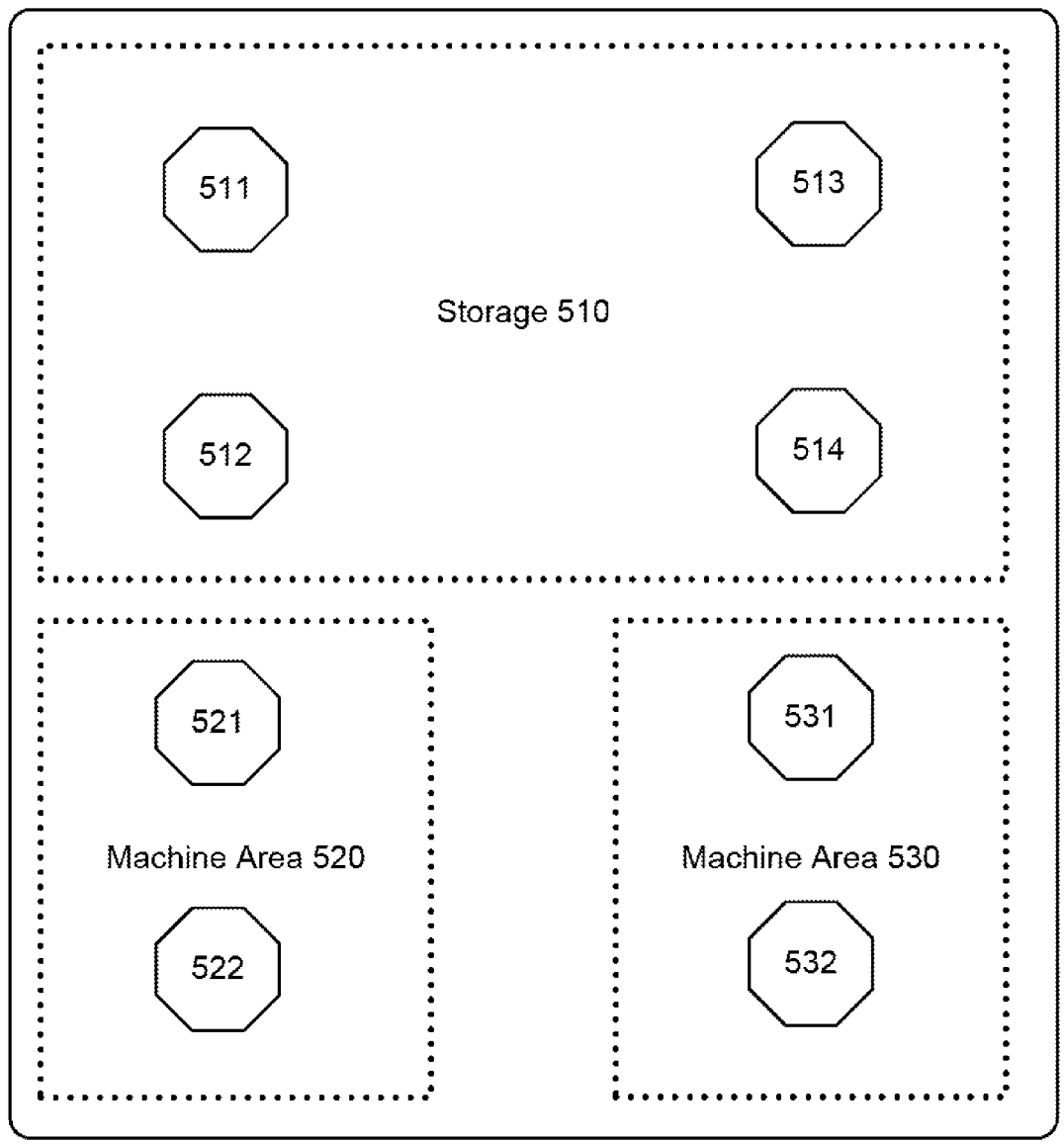
FIG. 5 is a simplified system block diagram of an industrial facility lighting system.

Referring now to FIG. 5, a system diagram of a facility lighting system 500 is shown. As with the prior figures, this diagram includes, for simplicity of description, only major functional components used for the discussion herein.

The industrial facility illuminated by system 500 includes a storage area 510 with luminaires 511-514, a first machine area 520 with luminaires 521-522, and a second machine area 530 with luminaires 531-532. Industrial facilities have very different lighting requirements than retail facilities. Generally, there is little need to "drive" traffic to one part of the facility or another; the focus instead is in safety, efficiency and cost-effectiveness. In the example facility illuminated by system 500 of FIG. 5, there may be only sporadic need for workers to enter storage area 510 to obtain materials. Therefore, area 510 is selectively illuminated based on proximity sensing and illumination is decreased whenever energy cost and availability considerations dictate a reduction in energy usage. In an alternate application, individual luminaires 511, 512, 513, 514 within the area 510 are likewise dimmed or turned off except when needed. Modern industrial facilities sometimes have ambient light sources as well (i.e., daylight "harvesting") and luminaires 511-514 are therefore selectively turned off and dimmed, either individually or in a group as desired, based on available daylight in storage area 510. In addition to a storage area, the example facility of FIG. 5 also has two machine areas 520. Worker safety may dictate bright lighting whenever a machine is being operated, so depending on the type of machine installed in each area, system 500 provides appropriate illumination. For example, if machine area 520 is a milling machine and machine area 530 is a foam packaging machine, the lighting requirements for area 520 may for safety concerns be far more exacting than for area 530. In such circumstance, luminaires 510 and 522 are programmed to operate at full illumination whenever either a worker is detected in area 520 or the milling machine is turned on; daylight harvesting is used only to selectively dim luminaires 521 and 522 a modest amount, and these luminaires are never disabled for energy-saving reasons. On the other hand, luminaires 531 and 532, which illuminate the area of the foam packaging machine, serve a far less dangerous area, and accordingly are dimmed or turned off as needed due to availability of ambient daylight, energy savings considerations and the like.

In order to simplify implementation of such strategies for multiple devices covering multiple areas, in one embodiment data from a sensor causes an event message, rather than a command message, to be generated and transmitted to various devices, e.g., luminaires 511-514, 521-522, and 530-531. Each such luminaire is then able to respond in its own appropriate manner to the event, based on its location and purpose. For example, a sensor event indicating that a person is in storage area 510 during regular working hours might indicate a need to illuminate all of the luminaires 511-514, 521-522, and 530-531 to full power since it might suggest that the machines are about to be put to use, but the same event occurring during non-working hours might not trigger the luminaires 521-522 and 530-531 in working areas 520, 530 because it is more likely that the presence of the person is not related to the machines about to be put into use. By sending an event message rather than a command message, each luminaire can determine based on its own programming whether to turn on, turn off, dim, etc. This greatly reduces the complexity of command programming and allows for full flexibility of the system to achieve any desired manner of operation.

As another example of an application, a common problem with motion sensors for lighting is that people who are sedentary (e.g., those typing at a computer) may not move enough for the sensors to think that a space is occupied, with the result being that room lights may turn off when the room is in fact occupied. Instead of a conventional motion sensor system that requires the user to wave hands or get up to re-trigger the lights, in one embodiment a luminaire 100 responds not only to sensor 311, but to other event messages indicating that the illuminated area is indeed occupied. Specifically, examples of other input include network activity emanating from the user's computer (interpreted as an indicator that the person is present in the room), and an event indicating that the user's computer has gone into a hibernation mode (interpreted as an indicator that the room may be empty). In some embodiments, fuzzy logic is used to learn which combinations of events are most likely to indicate presence or absence of a person. For instance, if one set of events that is initially interpreted as appropriate to turn off the lights is immediately followed by motion after the lights are turned off, that set of events will, over time, be interpreted as not likely a good indicator that the room is empty. Thus, for each user the system learns what set of events are normal when the room is occupied, and what set of events is more likely to indicate that there is no one in the room.

Since each of the luminaires 511-514, 521-522 and 531-532 has its own on-board processor and individually addressable communications port, no wiring changes are needed if the workspace they illuminate is reconfigured; reprogramming is all that is required to change illumination characteristics as needed. Furthermore, provision of such on-board processor permits either the luminaires themselves or a remote processor to handle tasks that previously required manual intervention. For example, calibration of light levels in one embodiment is accomplished by comparing illumination levels at full power with that at dimmed levels (e.g., for light harvesting) by processing images from a conventional security camera that is connected, whether directly or indirectly, to either the corresponding luminaire or a remote computer in communication with that luminaire. Likewise, processing of such images from a security camera is, in one embodiment, used to detect both light levels and movement (e.g., presence of a customer or a worker in the area serviced by a particular luminary)

In many applications, the sunk costs of legacy lighting systems are too great to permit complete changeover to fully programmable luminaires such as luminaire 100 of FIG. 1. In order to provide some of the advantages of luminaires 100 while maintaining portions of legacy lighting systems, ports 150, 160 are configurable to provide control of external lighting systems as well as integrated lamp 140. In still other embodiments, the components of luminaire 100 other than the lamp are packaged as a unit for connection to such legacy systems, to effectively provide the ability to control and communicate as if they were luminaires 100. Further, remote computer 220 is configured to provide not only instructions to processor-enabled luminaires 100, but in addition to provide conventional digital and analog control to portions of legacy lighting systems.

Sensor Port 160 and Data Port 150 in many instances operate independently of one another. For example, Sensor Port 160 may have a motion sensor attached to it to dim the lights when no one is within view. Data Port 150 may be connected to a remote PC to collect maintenance information, such as changes in current draw or light output that can be used for predictive maintenance, on the ballast, lamp, or other components, or to remotely turn the lights on/off at the beginning and end of the day. In other instances, by using processor 135, the operation of the sensor connected to Sensor Port 160 can be monitored by the remote PC via Data Port 150. This allows for a single purpose sensor to serve in secondary functions. For example, a connected motion sensor's primary function is to dim the lights when people are not in the area. With the ability to monitor the motion sensor via Data Port 150, the motion sensor's operation can be logged to track and report on occupancy patterns in a given areas. In particular embodiments, these patterns are used in a variety of ways such as logging customer traffic patterns or work studies. Such information is also usable for resource management purposes, such as determining based on sensor data which portions of a retail facility should be staffed with more store clerks, based on customer activity. Furthermore, in one embodiment each luminaire is identified in the system with its corresponding physical location, so that maintenance data concerning that luminaire is correlated with a physical location. This permits maintenance personnel to quickly locate luminaires requiring maintenance services. In one specific embodiment, each device has a unique internet protocol address, and those addresses are mapped in a computer system to corresponding physical locations. In certain applications, integration with other environmental, cultural, legal or other factors is enabled through use of ports 150 and 160 as described above. For instance, there may be legal occupancy control requirements that can be monitored and addressed through proximity sensors, cameras, or light beam subsystems connected to ports 150 and 160. In another applications, climatalogical data is used to modify the system's control of grow lights in a greenhouse. Other applications, including temperature/humidity control, advertising (billboards), architectural lighting, recreational lighting (indoor and outdoor) and retail "high bay" lighting will be apparent to those skilled in the art. In one application for low-light situations, an infrared camera us used for the imaging applications described herein.

Because luminaires 100 are software-controllable, whether autonomously or from a remote computer system, dimming capabilities are wide-ranging. In one application, as soon as activity in a facility is detected, luminaires are changed from an "idle" state to a "ready" state that, while still relatively low-power, allows the luminaires to be brought up to full brightness much more quickly than from idle state. From "ready" state, power consumption can be quickly controlled as desired to either increase or decrease light output. In one specific embodiment, ballast control circuit 130 programmably provides differing waveforms to accomplish the desired dimming profile. In one embodiment the waveform frequency is altered for dimming; in a second embodiment, waveform shape is altered; those skilled in the art will appreciate that a combination of waveform parameters may be altered to achieve effective dimming, depending on the type of lamp that is to be controlled. Since often a facility will be lit by several different types of lamps, the software control in some embodiments includes use of a lamp specific lookup table, transfer curve or similar mechanism to allow linear or other desired dimming characteristics for each controlled lamp. In some applications, dimming is based on more than one parameter; for example, motion sensing may be based on desired power to lamps while daylight harvesting may be based on desired lumens for the illuminated area. Again, software control permits each event (e.g., motion sensor signal or daylight harvest level) to cause the lamp to be set to the desired output, whether such output is considered in terms of power used, lumens produced, or some other factor. Furthermore, different types of inputs are usable for controlling environmental aspects other than lighting. For example, in a humidity-controlled greenhouse, input from a daylight harvesting sensor suggesting a very cloudy and therefore potentially rainy day is usable to reduce the typical amount of misting that will be provided to plants, since the ambient air is likely to be more humid and less sunlight is likely to reduce normal transpiration and evaporation.

A daylight harvesting sensor's primary typical function is to partially dim a fixture based on the amount of ambient light in an area. By monitoring this operation via Data Port 150, ambient light can be logged to determine length of day, or determining when outside doors are open (which may be cross referenced with HVAC systems to determine inefficiencies in worker habits). In an alternate embodiment, processor 135 logs the information from Sensor Port 160 and stores the information, which is the later retrieved by a remote PC via Data Port 150.

In still another embodiment, the addition of Sensor Port 160 and Data Port 150, the feedback and logging described above can be incorporated in other devices besides luminaires, such as HVAC, to provide similar control.

Expanding the feedback and logging described above, in one embodiment this information is stored in a database and used for energy management purposes, such as demand response systems, which supplies flexibility and dynamic decision making in energy reduction choices to provide minimum disruption for energy consumers. As further described below, feedback mechanisms are placed in facilities to monitor activities instead of simple local information directly related to a specific device such as a light fixture.

For instance, many facilities suffer penalty charges when their energy use crosses a peak demand threshold. These facilities may have meters that can alert them when their energy usage is approaching this threshold, giving them an opportunity to implement immediate changes to avoid crossing this threshold. These changes typically mean reducing the energy consumption by performing preconfigured actions such as automatically turning lights off and/or reducing HVAC loads. These reductions are constant across the facility.

By monitoring feedback (as described above) where human traffic is logged in a database, when the peak demand threshold is approached, the traffic can be analyzed versus the current date/time, and intelligent choices can be made to reduce energy consumption with less impact to humans. For example, a facility using a conventional method may dim the lights 15% across the facility affecting all workers. In contrast, in a preferred embodiment worker traffic patterns are logged over time and, for example, it may have been determined that one corner of the facility contains 80% of the workers for a given time of day. The lights in this corner are then only dimmed 5%, whereas other areas that have nearly no traffic are dimmed 20%, and the remaining sections are dimmed 15% to achieve a desired energy reduction.

Taking this example to a larger scale, a utility company may need to reduce the load on a given grid to avoid a brownout. The utility contracts with its customers to allow remote operation of their energy load reduction system. Conventionally, the utility sends a signal to customers to reduce their loads by 5% across the board and all participating consumers must lower their load by 5%. In contrast, in a preferred embodiment the utility monitors human traffic and activities and makes intelligent decisions. For instance, Facility A is a manufacturing operation with workers working in the morning hours, whereas Facility B is a grocery store. The utility has monitored and logged traffic in the facilities and when the grid load must be reduced at 10 a.m., it is found that statistically at that time of day there is heavy human traffic in Facility A (where the workers are working) versus light traffic in the grocery (facility B). The utility then dims the lights in Facility A only 3%, whereas it dims the lights in Facility B 9%. Later in that same day around 4 pm, the load is to be reduced again. This time the logged data statistically shows that the workers have now all left and Facility A has light traffic, whereas Facility B, the grocery, has heavy traffic (possibly because the workers from Facility A have stopped there on the way home). This time the utility makes the dynamic decision to dim the lights in Facility A 15%, and not dim Facility B at all.

Referring again to FIG. 2, because luminaire 100 is controllable from a remote computer 220, the utility achieves reductions as described above by transmitting corresponding dim commands to luminaires such as 100.

The availability of multiple sensors communicating events to multiple luminaires permits highly individualized programming of luminaires and other related devices to fit the needs corresponding to their locations. For example, in a situation in which a luminaire is programmed to respond to both a daylight harvesting sensor and a motion sensor, in one embodiment the luminaire is programmed to ignore events from the daylight harvesting signal when the motion sensor indicates that the corresponding area does not have any people in it (thus resulting in a "dimmed" state). When people are present, an event from the daylight harvester is interpreted differently, setting the maximum illumination level from the luminaire based on available daylight.

Using another example, consider storage area 510 covered by four luminaires 511-514. In one embodiment, each of these may have a motion sensor associated with it, and detection of motion under either of the two left-side luminaires 511 or 512 causes them both to turn on, but not impact the two right-side luminaires 513, 514. If there is an additional daylight harvest sensor in the storage room, all four of the luminaires respond to events relating to the output of that sensor.

In this manner, sensors are logically capable of being decoupled from the luminaires to which they are attached. In some applications, this can lead to significant benefits. For instance, in one embodiment daylight harvesting sensors are connected to each luminaire, e.g., 511-514. One example of such a daylight harvesting sensor is a video camera, with certain pixels being chosen as indicating locations in which changes in illumination suggest changes in available daylight. Due to issues such as shadows from ceiling beams that move as the sun traverses the sky, changes in brightness based on people wearing dark clothing or darkly colored equipment being moved through the area, etc., the output from each sensor may not be reliable at all times. By averaging the information provided by multiple such sensors, however, e.g., from different pixel locations from one video camera and by multiple cameras at each of the luminaires, a far more reliable indication of available daylight is provided. Processing of events from each sensor by each luminaire allows such benefit to be achieved easily, and also permits additional processing to produce improved results. For example, hysteresis processing is used in one embodiment to prevent small changes in sensed brightness causing constant adjustment of brightness; in another embodiment, damping processing is used to prevent a change in brightness of, say, luminaire 511 to be interpreted as a change in available daylight at, say, luminaire 512. Without such processing, open-loop effects such as strobing can occur that result in uneven and distracting lighting effects. Further techniques to prevent such artifacts, such as luminaire 512 taking into account in its daylight harvesting processing an event from luminaire 511 stating that luminaire 511 has just increased its output, ensures that the overall system responds only input information that truly indicates a change in available daylight. Thus, knowledge of what one device is doing helps another device avoid getting "fooled" about what to do.

To provide another example of this, consider a facility with a large lighting system that produces a great amount of heat. It may be important for the HVAC system to know that a drop in sensed temperature is the result of the lights being turned off rather than the outside temperature dropping. By having the luminaires send event messages stating that they are being turned off, the HVAC system may ignore a corresponding drop in temperature rather than triggering the system to turn on the heat. This is often the sensible approach at the end of a workday, when the lights go off and lower temperatures may be tolerated. Those skilled in the art will recognize that many different applications will allow devices to benefit from events communicated both from sensors and from other devices, in this manner.

The control of intelligent demand response and energy saving devices pose a problem as they operate on multiple communications protocols and topologies. Additionally, they have varied commands, capabilities, and accessories. This makes the creation of communication and operational control software on a PC a challenge.

Traditionally, control software is designed to control specific hardware whose communication methods are known, as well as devices whose capabilities are known. This forms a device dependant system for the software. A software application must explicitly know the communication method of the device as well as its capabilities and how to operate these features.

In a preferred embodiment, a software program includes a hardware abstraction layer (HAL) forming an application programming interface. The HAL is a software library that supports high-level interfaces of all known demand response devices' capabilities. Control software applications only interface with these interfaces found within the HAL.

The HAL also supports low-level interfaces to control demand response devices. These devices are directly interfaced with small libraries that contain the software code to communicate with the device via its hardware topology/protocol. These libraries are called device drivers. The device drivers only interface with HAL low-level interfaces.

The devices (via their device drivers) are listed with the HAL as existing. The control software calls a high-level function in the HAL to obtain the list of available devices. Additionally, the HAL details the type of device (light, HVAC, etc) and its capabilities. When the control software wishes to send a command to the device, it does so through a standard high-level interface in the HAL. The HAL then initiates communication with the device via a low-level function to the device driver. The device driver itself explicitly opens communication with the device. Thus, the control software calls a high-level function in the HAL to command a device to do something. The HAL calls an appropriate low-level function to the device driver which issues commands to the actual device to perform the action.

An advantage of this method is that control software does not have to explicitly know the details of the device it is controlling. In traditional control software, the software can only control devices that it was designed for (device dependant design). With the HAL method, control software written for devices available today can also control devices that are created after the software. The future device simply supplies a device driver to the HAL, and the control software can use it as if they were created together. This forms a device independent design.

Figure 6:
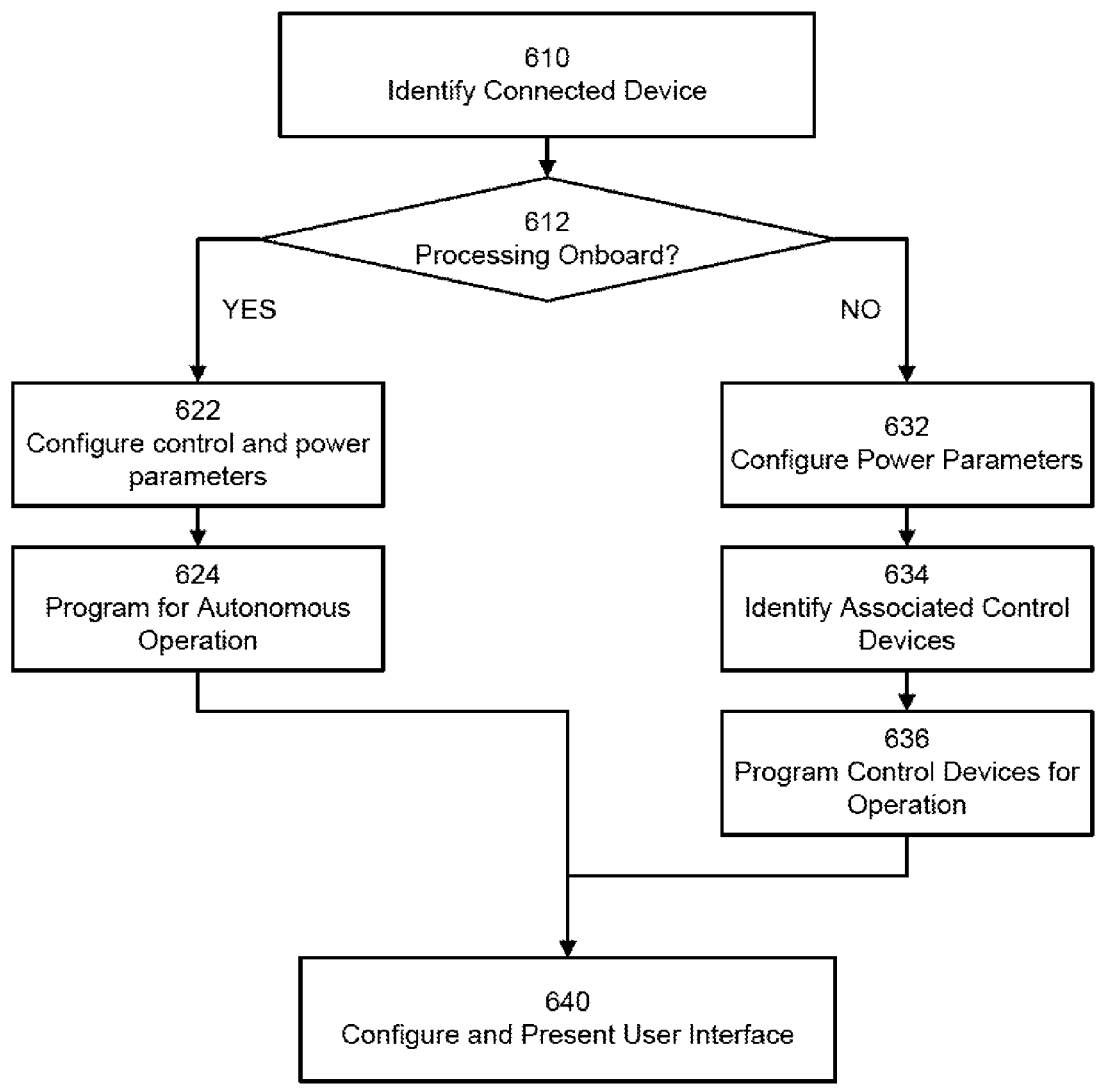
FIG. 6 is a flow diagram of lighting control processes.

In one embodiment, to further enable control of mixed systems including processor-enabled luminaires and legacy components, an application program interface software subsystem is provided for remote computer 220 to identify a variety of supported lighting devices and provide control to them under a common user interface. Referring now to FIG. 6, there is a flow diagram of processing for a lighting application program interface 600.

First, the connected device is identified 610. In a preferred embodiment, devices with on-board processors preferably provide a unique identification code with not only an IP address, but also a device identification code. In one implementation, an identification scheme as used with USB devices is employed to uniquely identify the type of a device. To identify devices without on-board processors, such as legacy lighting systems, operating characteristics are observed at the control point for such devices. In one application, a remote switching unit with its own processor is installed in place of the conventional manual switch for a lighting circuit. The remote switching unit includes a shunting amperage detection circuit to measure the amperage flowing to a lighting circuit over time. Each type and size of lamp exhibits different surge characteristics as it is energized; the remote switching unit is configured to have a "load identification mode" in which it reports back to remote computer 220 information from which the identification of the load can be determined. In one implementation, upon receiving a request for load identification the remote switching unit energizes the connected device and reports the amperage over time for the first five seconds of operation; remote computer 220 compares this with known characteristics to determine the type (e.g., HID, fluorescent, incandescent) of lamp and wattage. If the characteristic is not recognized, remote computer 220 assumes the load is of mixed type (i.e., some lamps of one type and some of another) and chooses control parameters acceptable to any likely connected lamp. If the characteristic is recognized, remote computer 220 assigns the remote switching unit as corresponding to a particular lamp type and it is treated as a luminaire with on-board processing. In another application, a more simplistic remote switching unit is used that does not have any on-board processing (e.g., a simple voltage-controlled rectifier circuit). In this instance, the presence of a control line and the absence of an identifying code is used to determine that a "dumb" remote switch without on-board processing is the control for that connected device. In one embodiment, manual identification of a connected device is also provided.

If on-board processing is detected 612, the next stage is to configure 624 the remote device with both control and power parameters. Control parameters are those instructing the device what factors are to determine its operational state, i.e., full-power, dimming level, and off. Power parameters are those setting the electrical characteristics for each of the operational states. For instance, one type of lamp may exhibit extended life if the initial arcing use to produce light upon start up is provided by a particular waveform of electricity, while maintaining that illumination is most efficaciously accomplished through another waveform.

Next, the device is programmed 624 to operate autonomously. For example, a luminaire 531 with an associated ambient light sensor installed in machine area 530 of the industrial facility of FIG. 5 is instructed to maintain a given ambient light level, supplementing daylight with its own illumination only as needed to maintain that level. In contrast, luminaire 521 in machine area 520 is instructed to maintain full illumination whenever its proximity sensor determines a person is in that area or whenever the milling machine in that area is turned on. In this example, luminaire 521 communicates with a sensor that determines whether that milling machine has been turned on.

If check 612 determines that the device does not have associated processing power, then control parameters for the device will not be determined at the device itself but rather at remote computer 220. Accordingly, the only parameters to be configured 632 are power parameters so as to correspond to the type of device (e.g., HID or fluorescent lamp type and specific wattage). Remote computer 220 then identifies whether any associated devices will be used to provide control for this device. For example, if luminaire 511 includes an on-board processor but luminaires 512-514 do not, luminaire 511 may be used as a "master" to control "slave" units 512-514, without any processing power being required from remote computer 220 other than facilitating transmission of on-off commands from the master unit 511 to the remote switches for slave units 512-514. Remote computer 220 then programs 636 the associated control device (in this case, luminaire 511) as appropriate for the operation of units 512-514.

Whether or not the connected device has on-board processing capability, the next step is to configure and present a user interface to provide user-friendly information relating to the device. In one embodiment, user interface information is provided at multiple levels of abstraction, from the overall system level down to each connected lamp and sensor.

The systems discussed herein are usable for more than simply control of lighting fixtures. Related systems operate based on many of the same parameters. For instance, heating, ventilation and air conditioning (HVAC) systems share many characteristics with lighting systems, even though different parameters may impact their operation. More specifically, it may be that large amounts of ambient daylight indicate a reduced need for electrical lighting, but an increased need for HVAC operation. The same sensors used to adjust lighting parameters are usable to control other systems, whether HVAC, alarm, security (access controls) or otherwise. In one embodiment, remote computer 220 is programmed to provide control signals to, for instance, HVAC zones within a facility. For example, using the industrial facility of FIG. 5, HVAC zones in storage area 510 and machine areas 520 and 530 are selectively controlled based on presence of personnel, ambient conditions and energy costs. To give one specific example, as an electric utility provides notice of increasingly severe peak load conditions, first luminaires 511-514 are dimmed, then cooling for storage area 510, then cooling for machine areas 520 and 530, then lighting for machine area 530 is dimmed, and finally lighting units 511, 513, 512 and 514 are turned off sequentially in order to minimize peak load conditions. In another example, off-hours movement detection in storage area 510 results in illumination of whichever luminaires 511-514 are in closest proximity to the movement, so as to give a warning to unauthorized persons that their presence has been detected and they are being tracked. In still another example, ambient light sensors co-located with luminaires provide highly location specific information as to where ambient light is sufficient for operational requirements, and based on threshold ambient light values, lamps are selectively dimmed and turned off in response to peak load conditions.

By including multiple sensors, e.g., 311, 321, each of which can communicate not only with luminaires, e.g., 310, 320, but also networked computer systems, a wide variety of data are available for multiple purposes beyond control of lighting, HVAC and other environmental systems. In one embodiment, the data collected by the sensors are provided onto a networked computer system, which may be either a locally networked computer or a system elsewhere in the "cloud" of computing systems accessible through wide area networks such as the Internet. Such data are then available for a wide array of purposes, either directly or through knowledge mining facilities. In one application, data collected by the sensors is pushed into a repository and stored for processing in any manner as may be desired. With the cost of data storage decreasing over time, it becomes reasonable to simply store sensor information for uses that may not initially be apparent. For example, if an intermittent problem with a lighting system is noticed, historical data from the sensors is usable to determine when the problem began and can potentially assist in troubleshooting or determining preventative maintenance schedules. In applications in which the sensors are video cameras and similar optical devices, by storing video data new and unexpected uses for the data can be determined after the fact. For instance, in a warehouse application, the warehouse owner may learn that items are being stolen, and the stored video can then be used to help determined when such theft occurred and who was responsible for such theft.

In the area of predictive maintenance, one embodiment makes multiple uses of stored video data. For example, some fluorescent lamps begin to flicker long before they completely fail. For portions of a video signal that historically do not change rapidly, processing on pixel data is used in one embodiment to determine that the lamp is flickering. Likewise, the color temperature of the light produced by some lamps changes as the lamp nears the end of its useful life. Analysis of otherwise static pixels from a camera sensor is used in one embodiment to predict that a lamp is nearing the end of its life due to such changes in color temperature.

Thermal sensors detecting changes in heat output, and current sensors detecting changes in wattage likewise used in certain embodiments to determine lamp or ballast characteristics suggesting the need for maintenance. In one specific embodiment, the current from a multiple-tube fluorescent fixture typically drops when one tube ceases to operate, and in such embodiment the data from a current sensor is processed so that such changes in current flag the need for tube replacement.

By pushing all of this sensed data to remote computer systems, in some embodiments processing of aggregated data provides additional benefits. For example, rated lamp life may not match actual lamp life in many installations, for example due to temperature extremes, humidity, salty air in coastal installations, and the like. Aggregating lamp life information through sensed, stored and processed data permits a facility to better predict its maintenance costs and related resource allocation needs.

In some installations, the amount of data so collected and processed is significant. Therefore, data processing elements such as the bridges and gateways discussed herein are in some embodiments implemented with their own on-board capability for data processing, so as to minimize the amount of data that is to be constantly pushed onto the cloud of external computing devices described above. In one particular embodiment, a gateway includes a conventional blade server that stores raw sensor data and processes it, sending out to the cloud only exceptions and summary reports. In a specific application, such a gateway with a blade server stores a week's worth of video from all connected video camera sensors, but only sends such data to the cloud upon a specific request (e.g., because goods in the area under surveillance have been stolen) or upon an exception being determined (e.g., a change in color temperature at night suggesting that a lamp is nearing end of life).

In order to maximize usability of stored sensor information, in one embodiment sensors, e.g., 311 and lamps, e.g., 310, are uniquely identified and mapped to a facility so that a sensed problem can be quickly rectified. A large warehouse may, for instance, have thousands of lamps, so knowing where a failing lamp is located is quite important. Even if "dumb" sensors are employed, on-board processing by the luminaire to which they are connected allows the data corresponding to the sensor to be tagged with such identification. It is found that using conventional internet protocol (IP) address techniques to identify locations corresponding to sensed data and individual luminaires is well suited to such purposes, and scales very well. In addition, conventional techniques already exist to help determine geographic locations corresponding to IP addresses.

While the example provided in connection with FIG. 5 relates to an industrial setting and machinery, similar applications arise in facilities having large electronic equipment installations, such as information technology centers. The environmental requirements for computer servers, for example, when they are idle as opposed to operating near capacity, are significantly different, and lighting and HVAC requirements in this application are adjustable in one embodiment based on such operational conditions.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

What is claimed is:

1. A system for control of a set of powered utilities comprising:
   a first device being configured to alter a first state of a first powered utility;
   a second device being configured to alter a second state of a second powered utility, said first and second powered utilities being utilized by consumers;
   a first sensor port being located on said first device, said first sensor port being configured to receive first sensor data from a first sensor, said first sensor data being logged over a period of time;
   a second sensor port being located on said second device, said second sensor port being configured to receive second sensor data from a second sensor, said second sensor data being logged over a period of time;

a first processor transmitting said first sensor data from said first sensor port to a remote processor; and a second processor transmitting said second sensor data from said second sensor port to said remote processor;

wherein said remote processor receives said first and said second sensor data after said first and said second sensor data are logged, and analyzes said first and said second sensor data for resource management purposes wherein after receiving and analyzing said first and second sensor data for resource management purposes, said second processor transmits a signal to alter said first state of said first powered utility to a third state to decrease power consumption of said first powered utility by a first percentage; wherein after retrieving and analyzing said first and second sensor data for business resource management purposes, said second processor alters said second state of said second powered utility to a fourth state to decrease said second powered utility's power consumption by a second percentage; and wherein said first and said second percentages minimize disruption for said consumers utilizing said first and said second powered utilities.

2. The system from claim 1, wherein said first and second powered utility are one of a luminaire and an HVAC system.

3. The system from claim 1, further comprising:
a data port being located on said first device, said data port being configured to receive a signal;
wherein said signal is received from a utility company; and
wherein said first and second percentages are selected based on said signal.

4. The system from claim 1, wherein said first and second percentages are selected based on information regarding an actual usage scheme of said first and second powered utilities engaged in by said consumers.

5. The system from claim 4, wherein said first and second sensor data is used to determine said actual usage scheme.

6. The system from claim 5, wherein said first and second sensor data is logged and trended using fuzzy logic to determine said actual usage scheme.

7. The system from claim 4,
wherein said remote processor sends messages to said first and second devices; and
wherein said first and said second sensor data is used to determine said actual usage scheme.

8. The system from claim 7, wherein said first and said second sensor data is combined with environmental, cultural, or climate-related information to determine said actual usage scheme.

9. The system from claim 8, wherein:
said first powered utility is located in a first facility; and
said second powered utility is located in a second facility.

10. A method for controlling a set of powered utilities comprising the steps of:
altering a first state of a first powered utility to decrease the power consumption of said first powered utility;
altering a second state of a second powered utility to decrease the power consumption of said second powered utility, said first and second powered utilities being utilized by consumers;
receiving first sensor data from a first sensor port, said first sensor port being located on said first powered utility;
receiving second sensor data from a second sensor port, said second sensor port being located on said second powered utility;

logging said first and said second sensor data over a period of time;

transmitting said first sensor data from said first sensor port by a first processor to a remote processor;

transmitting said second sensor data from said second sensor port by a second processor to said remote processor;

receiving said first and second sensor data by said remote processor;

analyzing said first and second sensor data for resource management purposes wherein after receiving and analyzing said first and second sensor data for resource management purposes, said second processor transmits a signal to alter said first state of said first powered utility to a third state to decrease power consumption of said first powered utility by a first percentage; wherein after retrieving and analyzing said first and second sensor data for business resource management purposes, said second processor alters said second state of said second powered utility to a fourth state to decrease said second powered utility's power consumption by a second percentage; and wherein said first and said second percentages minimize disruption for said consumers utilizing said first and said second powered utilities.

11. The method from claim 10, wherein said first and second powered utility are one of a luminaire and an HVAC system.

12. The method from claim 11, further comprising the steps of:
receiving a signal from a utility company; and
delivering said signal to said first powered utility using a data port located on said first powered utility.

13. The method from claim 11, further comprising the step of:
determining an actual usage scheme of said first and second powered utilities engaged in by said consumers.

14. The method from claim 13, further comprising the step of:
receiving sensor data from a sensor using a sensor port on said first powered utility;
wherein said determining is conducted based on said sensor data.

15. The method from claim 14, further comprising the step of:
logging said sensor data;
wherein said determining is conducted using fuzzy logic.

16. The method from claim 13, further comprising the steps of:
receiving sensor data from a set of sensors using said remote processor; and
sending messages to said first and second powered utilities using said remote processor;
wherein said determining is conducted based on said sensor data.

17. The method from claim 16, wherein said determining is conducted based on environmental, cultural, or climate-related information.

18. A system for providing power to a set of facilities comprising:
a first data line configured for communication with a first energy load reduction system at a first facility;
a second data line configured for communication with a second energy load reduction system at a second facility;
a control system configured to send a first message on said first data line and a second message on said second data line; and a first sensor port being located on a first device configured to receive a first sensor data from a first sensor, said first sensor data being logged over a period of time;

a second sensor port being located on a second device configured to receive a second sensor data from a second sensor, said second sensor data being logged over a period of time;

a first processor transmitting said first sensor data from said first sensor port to a remote processor; and a second processor transmitting said second sensor data from said second sensor port to said remote processor;

wherein said remote processor receives said first and second sensor data after said first and second sensor data is logged and analyzes said first and second sensor data for resource management purposes wherein after receiving and analyzing said first and second sensor data for resource management purposes, said second processor transmits a signal to alter said first state of said first powered utility to a third state to decrease power consumption of said first powered utility by a first percentage; wherein after retrieving and analyzing said first and second sensor data for business resource management purposes, said second processor alters said second state of said second powered utility to a fourth state to decrease said second powered utility's power consumption by a second percentage; and wherein said first and said second percentages minimize disruption for said consumers utilizing said first and said second powered utilities.

19. The system from claim 18, wherein said control system is configured to select said first and second percentages based on information regarding an actual usage scheme of said first and second utilities engaged in by said consumers.

20. The system from claim 18, wherein said first and second messages are sent when said control system detects a potential brownout.

\* \* \* \* \*